(12) United States Patent
Sampathkumar

(10) Patent No.: US 8,615,641 B2
(45) Date of Patent: Dec. 24, 2013

(54) SYSTEM AND METHOD FOR DIFFERENTIAL BACKUP

(75) Inventor: Kishore Kaniyar Sampathkumar, Karnataka (IN)

(73) Assignee: Hewlett-Packard Development Company, L.P., Houston, TX (US)

(*) Notice: Subject to any disclaimer, the term of this patent is extended or adjusted under 35 U.S.C. 154(b) by 406 days.

(21) Appl. No.: 12/490,332

(22) Filed: Jun. 24, 2009

(65) Prior Publication Data

US 2010/0287348 A1    Nov. 11, 2010

(30) Foreign Application Priority Data

May 6, 2009 (IN) .......................... 1053/CHE/2009

(51) Int. Cl.
*G06F 13/00* (2006.01)
(52) U.S. Cl.
USPC ......................................................... 711/162
(58) Field of Classification Search
None
See application file for complete search history.

(56) References Cited

U.S. PATENT DOCUMENTS

| 6,915,397 B2 * | 7/2005 | Lubbers et al. ............... 711/162 |
| 7,043,605 B2 | 5/2006 | Suzuki |
| 7,085,899 B2 | 8/2006 | Kim et al. |
| 7,206,961 B1 | 4/2007 | Mutalik et al. |
| 2007/0245104 A1 * | 10/2007 | Lindemann et al. .......... 711/162 |

OTHER PUBLICATIONS

Symantec; 5.0 Veritas vol. Manager (VxVM) implements "Verites FlashSnap Point-In-Time Copy Solutions" http://www.sun.com/products-nsolutions/ha rdware/docs/pdf/875-3888-10.pdf.; 2006.

* cited by examiner

*Primary Examiner* — Duc Doan

(57) ABSTRACT

A method and system for differential backup of a logical disk of a data storage array is presented. The system comprises: a pool of physical storage space divided into a plurality of addressable memory locations; and a logical disk adapted to store metadata associated with a differential snapshot of the logical disk. The metadata comprises a mapping structure defining a sharing relationship between the differential snapshot of the logical disk and a previous snapshot of the logical disk that is arranged to serve as a baseline snapshot of the logical disk. The mapping structure is adapted to indicate disk regions of the logical disk that have changed in the differential snapshot of the logical disk with reference to the baseline snapshot of the logical disk.

12 Claims, 8 Drawing Sheets

SYSTEM AND METHOD FOR DIFFERENTIAL BACKUP

RELATED APPLICATIONS

Benefit is claimed under 35 U.S.C. 119(a)-(d) to Foreign application Serial No. 1053/CHE/2009 entitled "SYSTEM AND METHOD FOR DIFFERENTIAL BACKUP" by Hewlett-Packard Development Company, L.P., filed on 6th May, 2009, which is herein incorporated in its entirety by reference for all purposes.

BACKGROUND

Conventional data or information storage systems typically implement a file system to logically organize the information as a hierarchical structure of directories and files on a storage device.

The storage devices are typically disk drives organized as a disk array, wherein each disk is a self-contained rotating magnetic media storage device. The term disk in this context is synonymous with, for instance, a hard disk drive (HDD), a direct access storage device (DASD) or a logical unit number (LUN) in a storage device. Unless the context indicates otherwise, the term "disk" as used herein is intended to embrace not only magnetic storage devices, but also optical, solid state and other types of storage devices.

Recently, Network Attached Storage (NAS) and Storage Area Network (SAN) technologies have been used to provide storage with greater capacity, higher reliability, and improved availability. SAN is an architecture to attach remote storage devices to servers in such a way that the storage devices appear as locally attached to the operating system. NAS, in contrast to SAN, uses file-based protocols where it is clear that the storage devices are remote.

Data security is an important consideration in storage systems. One component of ensuring data security is generating backup copies of information stored on physical media in the storage system. Traditional techniques for generating backup copies of information stored on physical media involved making a redundant copy of the information, usually on a separate storage medium such as, e.g., a magnetic tape or optical disk. Such techniques raise multiple issues in large capacity storage, high availability storage systems. Foremost, traditional backup procedures may render the storage system inaccessible during the backup process, which is inconsistent with the goal of maintaining high availability. In addition, traditional backup procedures consume significant storage space, much of which may be wasted.

BRIEF DESCRIPTION OF THE DRAWINGS

For a better understanding of the invention, embodiments will now be described, purely by way of example, with reference to the accompanying drawings, in which.

DETAILED DESCRIPTION

Embodiments provide a method and system for creating, tracking and managing online differential backups and archives of data in a logical disk of storage arrays. Snapshot technology is built upon by the introduction of metadata which is stored in snapshots and exploited to reconstruct complete point in time (backup) images, or differential backups. Further, embodiments provide a system of data and metadata management for snapshot implementation which is optimized for differential backups and archives.

Use of the term "online" when referring to storage and backup refers to a storage medium (such as a magnetic disk) adapted for constant, rapid and nearly instantaneous access to the data stored by the storage medium. By contrast, "offline" storage refers to a storage medium (such as magnetic tape) adapted for infrequent access of the stored data for backup purposes, usually for long-term storage for example. For completeness, it is noted that "nearline" storage refers to an intermediate type of data storage that is a compromise between online storage and offline storage.

Embodiments make it possible to support online differential backups in Virtualized Storage Arrays by retaining certain meta-data related to snapshot virtual disks. This meta-data can then be maintained and associated with the original Vdisk (or its mirror copies) as well as snapshot virtual disks created from the original Vdisk. Not only does this provide a general approach to providing for a differential backup, this approach can provide for improved efficiency when making differential backups by keeping track of only the disk regions that have been changed.

Figure 1:
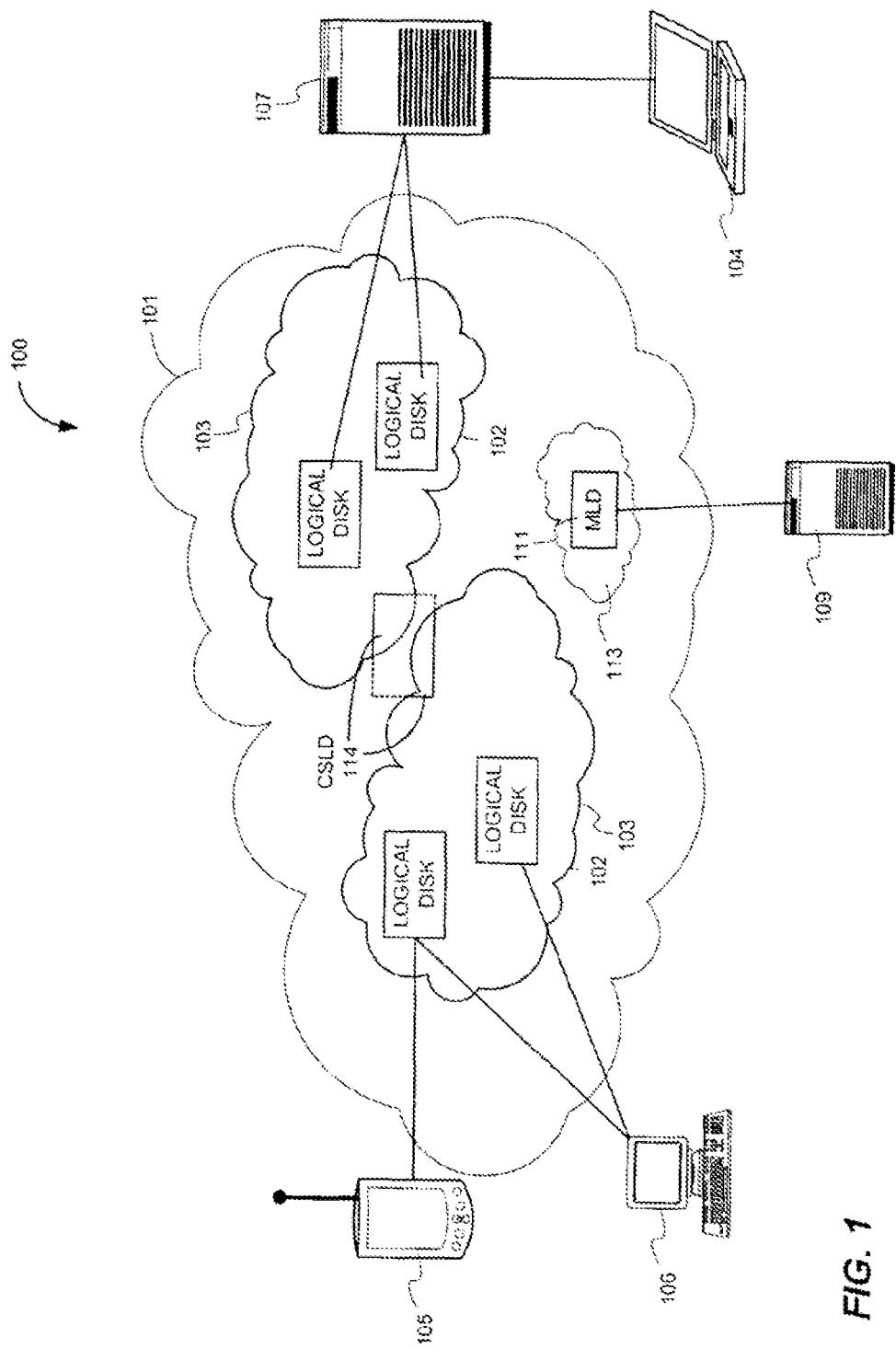
FIG. 1 shows a logical view of a networked computer environment in which a system in accordance with an embodiment is implemented.

FIG. 1 shows a logical view of an exemplary SAN environment 100 in which the present invention may be implemented. Environment 100 shows a storage pool 101 comprising an arbitrarily large quantity of storage space from which logical disks (also called logical units or LUNs) 102 are allocated. In practice, storage pool 101 will have some finite boundaries determined by a particular hardware implementation, however, there are few theoretical limits to the size of a storage pool 101.

Within pool 101 logical device allocation domains (LDADs) 103 are defined. LDADs correspond to a set of physical storage devices from which LUNs 102 may be allocated. LUNs 102 do not span LDADs 103 in the preferred implementations. Any number of LDADs 103 may be defined for a particular implementation as the LDADs 103 operate substantially independently from each other. LUNs 102 have a unique identification within each LDAD 103 that is assigned upon creation of a LUN 102. Each LUN 102 is essential a contiguous range of logical addresses that can be addressed by host devices 105, 106, 107 and 109 by mapping requests from the connection protocol used by the hosts to the uniquely identified LUN 102.

Some hosts, such as host 107, will provide services of any type to other computing or data processing systems. Devices such as client 104 may access LUNs 102 via a host such as server 107 to which they are coupled through a LAN, WAN, or the like. Server 107 might provide file services to networkconnected clients, transaction processing services for a bank automated teller network, telephone call processing services and the like. Hence, client devices 104 may or may not directly use the storage consumed by host 107. It is also contemplated that devices such as computer 106 and wireless device 105, which are also hosts, may logically couple directly to LUNs 102. While the present techniques are particularly directed to host systems that use large quantities of storage, it is uniquely able to provide such features as mirroring, parity protection, and striping in very small sized LUNs as well. In the past, such storage behaviors required multiple disks and so were inherently implemented with many gigabytes of storage. Hosts 105-107 may couple to multiple LUNs 102, and LUNs 102 may be shared amongst multiple hosts, although in a particular implementation each LUN 102 is presented to a specific host 105-107.

A LUN 102 comprises one or more redundant stores (RStore) which are the fundamental unit of reliable storage in the system of the present embodiments. An RStore comprises an ordered set of physical storage segments (PSEGs) with associated redundancy properties and is contained entirely within a single redundant store set (RSS). By analogy to conventional systems, PSEGs are analogous to disk drives and each RSS is analogous to a RAID storage set comprising a plurality of drives.

The PSEGs that implement a particular LUN 102 are spread across many, perhaps hundreds, of physical storage disks. Moreover, the physical storage capacity that a particular LUN 102 represents may be configured to implement a variety of storage types offering varying capacity, reliability and availability features. For example, some LUNs 102 may represent striped, mirrored and/or parity-protected storage. Other LUNs 102 may represent storage capacity that is configured without striping, redundancy or parity protection. As a practical consideration, the described embodiment limits LUNs 102 to 2 TByte capacity of any desired configuration, however, this limit can be readily extended independently of storage capacity of individual physical hard drives.

An RSS comprises a subset of physical disks in an LDAD. In preferred implementations, an RSS includes from six to eleven physical drives (which can change dynamically), and the physical drives may be of disparate capacities. Physical drives within an RSS are assigned indices (e.g., 0, 1, 2, . . . , 11) for mapping purposes. They may be further organized as pairs (i.e., adjacent odd and even indices) for RAID-1 purposes. One problem with large RAID volumes comprising many disks is that the odds of a disk failure increase significantly as more drives are added. A sixteen drive system, for example, will be twice as likely to experience a drive failure (or more critically two simultaneous drive failures), than would an eight drive system. Because data protection is spread within an RSS, and not across multiple RSSs, a disk failure in one RSS has no effect on the availability of any other RSS. Hence, an RSS that implements data protection must suffer two drive failures within the RSS rather than two failures in the entire system. Because of the pairing in RAID-1 implementations, not only must two drives fail within a particular RSS, but a particular one of the drives within the RSS must be the second to fail (i.e. the second-to-fail drive must be paired with the first-to-fail drive). This atomization of storage sets into multiple RSSs where each RSS can be managed independently improves the performance, reliability, and availability of data throughout the system.

A SAN manager appliance 109 is coupled to management logical disks (MLD) 111 which is a metadata container describing the logical structures used to create LUNs 102, LDADs 103, and other logical structures used by the system. A portion of the physical storage capacity available in storage pool 101 is reserved as quorum space 113 and cannot be allocated to LDADs 103, hence cannot be used to implement LUNs 102. In a particular example, each physical disk that participates in storage pool 101 has a reserved amount of capacity (e.g., the first "n" physical sectors) that is designated as quorum space 113. MLD 111 is mirrored in this quorum space of multiple physical drives and so can be accessed even if a drive fails. In a particular example, at least one physical drive is associated with each LDAD 103 includes a copy of MLD 111 (designated a "quorum drive"). The SAN management appliance 109 may wish to associate information such as name strings for LDADs 103 and LUNs 102, and timestamps for object birthdates. To facilitate this behavior, the management agent uses MLD 111 to store this information as metadata. MLD 111 is created implicitly upon creation of each LDAD 103. Quorum space 113 is used to store information including physical store ID (a unique ID for each physical drive), version control information, type (quorum/non-quorum), RSS ID (identifies to which RSS this disk belongs), RSS Offset (identifies this disk's relative position in the RSS), Storage Cell ID (identifies to which storage cell this disk belongs), PSEG size, as well as state information indicating whether the disk is a quorum disk, for example. This metadata PSEG also contains a PSEG free list for the entire physical store, probably in the form of an allocation bitmap. Additionally, quorum space 113 contains the PSEG allocation records (PSARs) for every PSEG on the physical disk. The PSAR comprises a PSAR signature, Metadata version, PSAR usage, and an indication a RSD to which this PSEG belongs. CSLD 114 is another type of metadata container comprising logical drives that are allocated out of address space within each LDAD 103, but that, unlike LUNs 102, span multiple LDADs 103. Preferably, each LDAD 103 includes space allocated to CSLD 114. CSLD 114 holds metadata describing the logical structure of a given LDAD 103, including a primary logical disk metadata container (PLDMC) that contains an array of descriptors (called RSDMs) that describe every RStore used by each LUN 102 implemented within the LDAD 103. The CSLD 111 implements metadata that is regularly used for tasks such as disk creation, leveling, RSS merging, RSS splitting, and regeneration. This metadata includes state information for each physical disk that indicates whether the physical disk is "Normal" (i.e., operating as expected), "Missing" (i.e., unavailable), "Merging" (i.e., a missing drive that has reappeared and must be normalized before use), "Replace" (i.e., the drive is marked for removal and data must be copied to a distributed spare), and "Regen" (i.e., the drive is unavailable and requires regeneration of its data to a distributed spare).

A logical disk directory (LDDIR) data structure in CSLD 114 is a directory of all LUNs 102 in any LDAD 103. An entry in the LDDS comprises a universally unique ID (UUID) an RSD indicating the location of a Primary Logical Disk Metadata Container (PLDMC) for that LUN 102. The RSD is a pointer to the base RSDM or entry point for the corresponding LUN 102. In this manner, metadata specific to a particular LUN 102 can be accessed by indexing into the LDDIR to find the base RSDM of the particular LUN 102. The metadata within the PLDMC (e.g., mapping structures described hereinbelow) can be loaded into memory to realize the particular LUN 102.

Hence, multiple forms of metadata are implemented that can be used for recovery. The CSLD 111 implements metadata that is regularly used for tasks such as disk creation, leveling, RSS merging, RSS splitting, and regeneration. The PSAR metadata held in a known location on each disk contains metadata in a more rudimentary form that is not mapped into memory, but can be accessed when needed from its known location to regenerate all metadata in the system.

Each of the devices shown in FIG. 1 may include memory, mass storage, and a degree of data processing capability sufficient to manage a network connection. The computer program devices are implemented in the memory of the various devices shown in FIG. 1 and enabled by the data processing capability of the devices shown in FIG. 1.

It is contemplated that an individual LDAD 103 may correspond to as few as four disk drives or to as many as several thousand disk drives. In particular examples, a minimum of eight drives per LDAD is required to support RAID-1 within the LDAD 103 using four paired disks. LUNs 102 defined within an LDAD 103 may represent a few megabytes of storage or less, up to 2 TByte of storage or more. Hence, hundreds or thousands of LUNs 102 may be defined within a given LDAD 103, and thus serve a large number of storage needs. In this manner, a large enterprise can be served by a single storage pool 101 providing individual storage dedicated to each workstation in the enterprise as well as shared storage across the enterprise. Further, an enterprise may implement multiple LDADs 103 and/or multiple storage pools 101 to provide a virtually limitless storage capability. Logically, therefore, the virtual storage system offers great flexibility in configuration and access.

Terminology

Let us denote the Original Vdisk as V.
Let us denote the following:
S0 is the Snapshot of V taken at time T0
S1 is the Snapshot of V taken at time T1, where T1 is later then T0.
S2 is the Snapshot of V taken at time T2, where T2 is later than T1.
Let us also designate the following:
Vdisk containing Snapshot blocks for S0 is V0
Vdisk containing Snapshot blocks for S1 is V1
Vdisk containing Snapshot blocks for S2 is V2
Let us introduce a term Logical Disk to indicate the underlying logical entity that has one-to-one relationship with the underlying physical disks containing actual blocks of data.

Using this terminology, let us designate the Logical Disk that contains the up-to-date data blocks as LD. Also, for all data blocks modified after creation of S0, let us designate the Logical Disk that contains the 'original' (unmodified) data blocks as LD0.

Snapshots

A snapshot logical disk is referred to as a "predecessor" logical disk (or simply "predecessor"), and the original logical disk is referred to as a "successor" logical disk (or simply "successor"). When the snapshot operation is executed, no user data needs to be copied from the successor logical disk to predecessor logical disk. Instead, the mapping structures necessary for representing the predecessor logical disk are generated and a "sharing relationship" is established between the predecessor and successor. This relationship is represented in the form of a bitmap termed "sharing bitmap".

S0: V0 contains the snapshot of the 'original' data blocks corresponding to the data blocks that have changed since this snapshot (S0) was taken. The 'snapshot' corresponding to unchanged blocks is contained in V itself.

In terms of Logical Disk terminology introduced so far, in the case where data blocks have changed in the original Vdisk V since the creation of this snapshot (S0), the corresponding 'original' data blocks are located on LD0, whereas the unchanged blocks are located on LD. These together constitute V0. Hence the snapshot image S0 is constituted from some data blocks located on LD and others located on LD0.

The above implies the following aspects about Snapshots:
A snapshot (S0) can have all its segments on LD, the Logical Disk corresponding to the original Vdisk V—This is the case on creation of the snapshot.
A snapshot can have some of its segments on LD, the Logical Disk corresponding to the original Vdisk V and other non-overlapping segments on LD0, the Logical Disk corresponding to Snapshot Vdisk V0—This is the case when 'some' of the segments in the original Vdisk are updated, due to which the original contents are copied over to LD0 in V0
A snapshot can have all its segments on LD0, the Logical Disk corresponding to Snapshot Vdisk V0—This is the case when 'all' the segments in the original Vdisk V have been updated since the creation of the snapshot Where the following restriction holds: Timestamp on each segment in the snapshot (S0) is the time at which the snapshot was created (T0).

Sharing bitmaps provides a very efficient way of handling the above aspects of a snapshot. Each bit of the bitmap represents a "logical segment" (or simply "segment") of the logical disk, where a segment is a pre-defined or Administrator configurable value corresponding to a "unit" of data space allocation and management in the logical disk (e.g., 1 MB). When multiple snapshots are created, the resultant set of bitmaps form a sharing hierarchy which is occasionally termed "sharing tree".

Both the predecessor and successor are allowed to remain active i.e., both read and write I/O operations are allowed on the predecessor and successor logical disks. The sharing tree is correspondingly updated to ensure data consistency and accuracy in both the predecessor and successor logical disks.

By way of example, let us consider the following setup, wherein:
There exists an original logical disk LD;
Snapshot S0 of LD is created at time T0;
Snapshot S1 of LD is created at time T1, where T1 is later than T0;
Snapshot S2 of LD is created at time T2, where T2 is later than T1; and
Snapshot S3 of LD is created at time T3, where T3 is later than T2.

As per the known method described in U.S. Pat. No. 6,915,397, when none of the segments are modified, the sharing tree for "each" segment is shown in FIG. 2.

Figure 2:
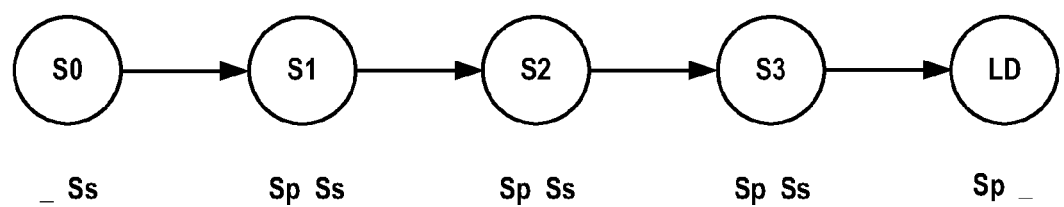
FIG. 2 illustrates a sharing tree for a segment according to an embodiment.

In FIG. 2, "Ss" and "Sp" indicated below the snapshots correspond to the Share Bits (also termed SBits) for a given segment. "Ss" corresponds to "successor" SBit being set and 'Sp' corresponds to predecessor SBit being set. Thus, in FIG. 2, the Sp marked below LD indicates that the contents for this segment are shared with its predecessor S3. This is in-turn indicated by Ss below S3. In other words, Ss below S3 indicates that its data is shared with its successor LD.

The SBits of the rest of the logical disks are set in a similar fashion. The successor SBit for LD is 'clear' since it has no successor. Similarly, the predecessor SBit for S0 is clear since it has no predecessor. The sequence (or linked list) of logical disks that share data hence form a "sharing tree". The SBits in each logical disk in the sharing tree describe which segments are shared between logical disks in the sharing tree.

To execute a Read I/O operation to a logical disk, successor logical disks in the sharing tree are traversed until the Ss SBit of a logical disk is 'clear'. This logical disk will point to the correct segment. By way of example, a read I/O directed to any logical disk depicted in FIG. 2 would traverse the sharing tree to logical disk LD, which would be the first logical disk encountered in which the Ss SBit is clear. The user data is contained in LD.

Processing Write I/O operations is more complicated since data consistency should be preserved/maintained when write I/O operations are directed to either the predecessor logical disk or its successor logical disk. Write I/O operation can be processed only after completing what is termed the Copy Before Write (CBW) (also sometimes termed Copy On First Write, or COFW) to preserve predecessor data when write I/O operations are directed to predecessor (see FIGS. 3a, 3b and 3c) or successor logical disks (see FIGS. 4a and 4b). After the data is copied, the sharing relationship between the predecessor and successor logical disks for the copied segment is broken or severed, also referred to as "unshared".

Figure 3A:
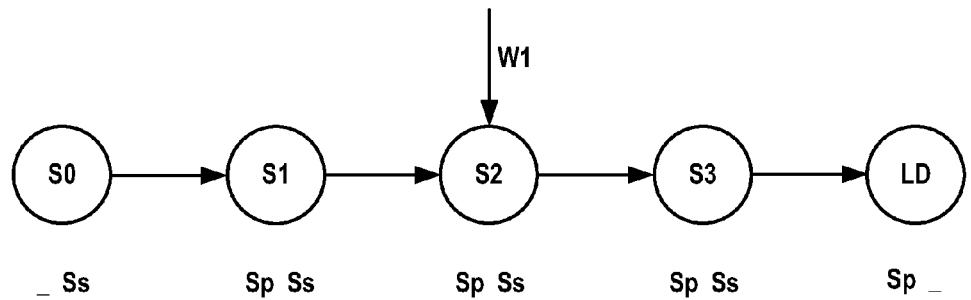
FIGS. 3a, 3b, and 3c illustrate a write I/O operation issued on snapshot S2 for the segment depicted in FIG. 2.
Figure 3B:
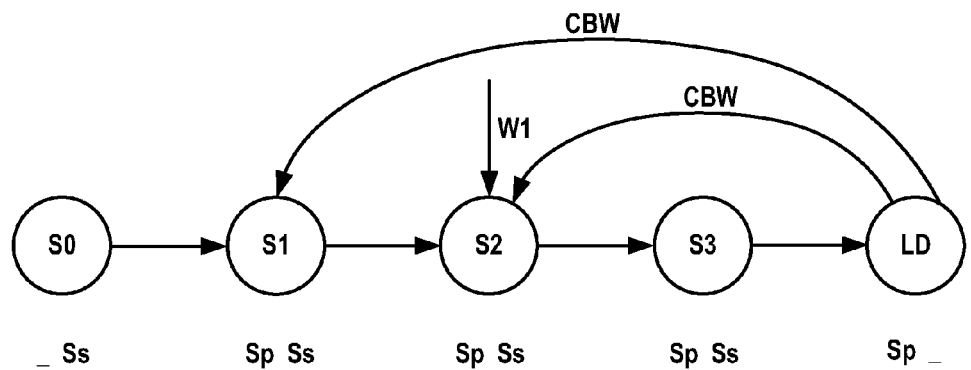

With reference to FIG. 2 and its corresponding description above, we now consider a Write I/O operation (W1) issued on snapshot S2 for a given segment Bk as shown in FIG. 3a. As per the known method described in U.S. Pat. No. 6,915,397, W1 can be processed only after the data in that segment (Bk) is completely unshared in S2 i.e., only after completing the below CBW for that segment (Bk) (see FIG. 3b):

Copy Bk from LD to S2
Copy Bk from LD to S2's predecessor (i.e., S1)

The segment to be copied is located using the algorithm described to perform a read I/O operation i.e. by traversing successor links until a clear Ss bit is located, which is the logical disk LD in this case.

Figure 3C:
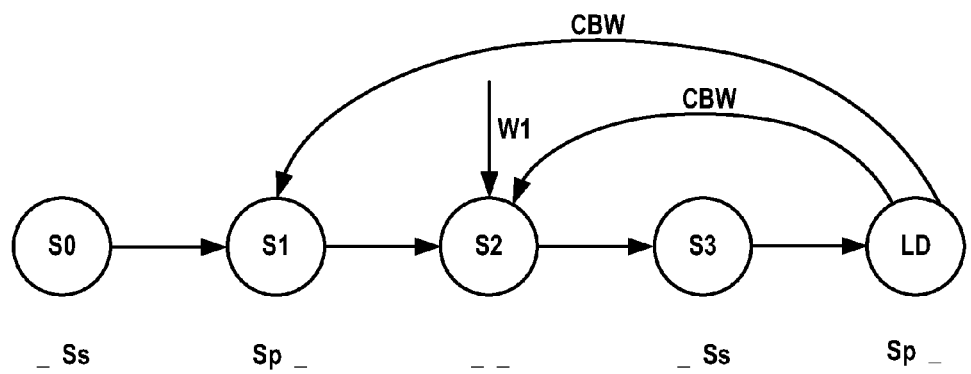

The resulting changes in the sharing tree for this segment Bk can then be represented as in FIG. 3c.

Figure 4A:
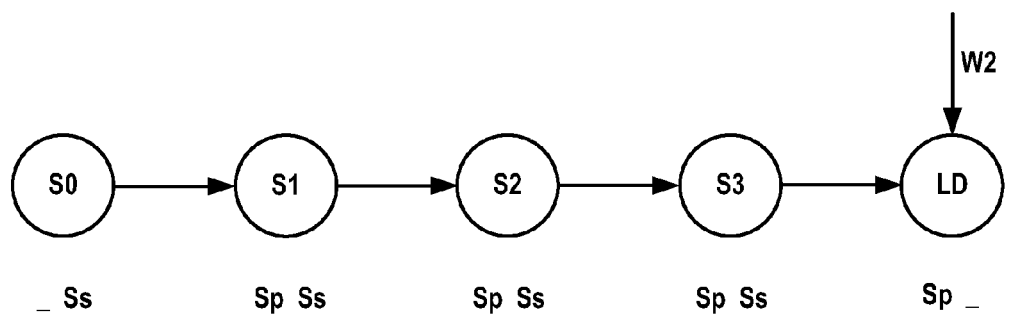
FIGS. 4a and 4b illustrate a write I/O operations issued on logical disk LD for the segment depicted in FIG. 2.
Figure 4B:
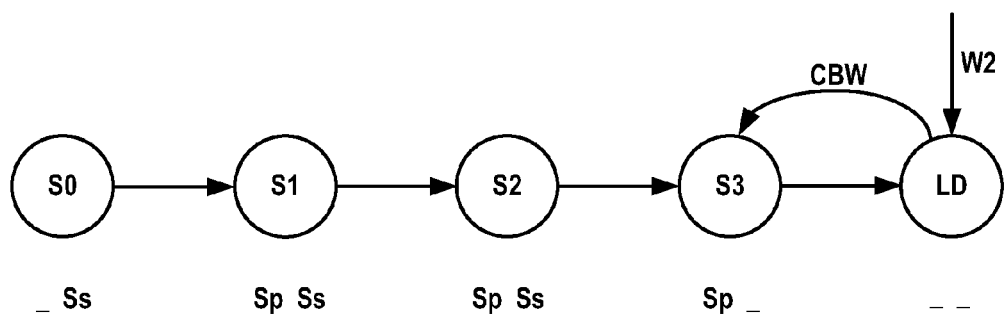

Similarly, with reference to FIG. 2, for a Write I/O operation (W2) issued on logical disk LD for a given segment Bk as shown in FIG. 4a, the resultant I/O processing and the changes to SBits are shown in FIG. 4b.

For purposes of embodiments, we are interested only in the Sp bit for any given snapshot. This is because, for determining 'sharing relationship' between a given snapshot St and its corresponding Baseline Snapshot (say B0), only the Sp bit of St needs to be traversed to see if it reaches B0. Henceforth, we simply refer to this as S-Bit of a given Snapshot. By this, we actually refer to the Sp bit. In an actual implementation, both Ss Bit and Sp Bits constitute the sharing bits and are stored for each segment in the metadata for Vdisk (together termed 'sharing bitmap').

Thus, in view of the above explanation, it will be understood that, for S0, a bit set in its sharing bitmap indicates that the corresponding segment is on LD, the Logical Disk corresponding to the original Vdisk V. A bit cleared in the sharing bitmap indicates that the corresponding segment is on LD0, the Logical Disk corresponding to Snapshot Vdisk V0.

Construction of Sharing Bitmap Between a Snapshot (St) and the Corresponding Baseline Snapshot (B0)

For any given segment, a 'sharing relationship' between a given snapshot St and its corresponding current Baseline Snapshot (B0) is determined by traversing the Sp bit of St for this segment and determining if it reaches B0. If this is true, then, there exists a 'sharing relationship' between St and B0. The resultant indicative bit value is set to 1. If not, it implies that 'sharing relationship' has been severed. Hence, the resultant indicative bit value is set to 0. The bit values for the sharing relationship corresponding to all the segments taken together results in the 'sharing bitmap' indicating a relationship between St and B0.

In the presence of previously created/existing D-snapshots, there is a more efficient way of constructing the 'sharing bitmap' for newly created D-snapshots. This hinges on the fact that the most recent previously created/existing D-snapshot (say Di) already has a valid 'sharing bitmap' between itself and the current Baseline Snapshot (B0). Hence, all that is needed is to traverse the Sp bit of St for a given segment and to determine if it reaches Di. If it does not, then, there does not exist a 'sharing relationship' between St and B0. The resultant indicative bit value is set to 0. If it does, then, the 'sharing relationship' between St and B0 is the same as the sharing relationship that already exists for this segment between Di and B0 i.e., the sharing relationship is 'inherited'. In such a case, the indicative bit value is set to the same value that already exists in Di for this segment. The bit values for the sharing relationship corresponding to all the segments taken together results in the 'sharing bitmap' between St and B0.

Generating Differential Backup Information

Generating the differential backup information for a Vdisk V has a pre-requisite step:

1) First, create a reference copy of the Original Vdisk V at a prior time (T0) by creating a Snapshot S0 of V at T0 with reference to which (future) differential backups need to be taken. V0 is the resulting Vdisk. Let us term this as 'Baseline Snapshot' or in short, B-snapshot. This step is completed every time a complete backup is needed.

Generating the differential backup information for a given Vdisk V at any given point in time (call it 'current time', indicated by 't') involves the following steps:

2) When the time comes to capture differential backup information for V (i.e., at 'current time'), create a Snapshot St of V at that particular point in time ('t'). The resulting Vdisk is Vt.

3) In order to capture online differential backup information for V at 'current time', capture the sharing bitmap between Snapshot (St) and the corresponding Baseline Snapshot i.e., B-snapshot (S0) at 'current time' (this can be undertaken as described in the previous section above entitled "Construction of Sharing Bitmap between a Snapshot (St) and the corresponding Baseline Snapshot (B0)"). Reverse the bits in the sharing bitmap for S0 to obtain 'differential backup bitmap'.

4) Associate this 'differential backup bitmap' with St (the snapshot created at 'current time') by storing it as part of meta-data for Vt.

5) Maintain an index to V0, which corresponds to B-snapshot S0, as part of the online differential backup information. This indicates the 'context' or 'baseline' for the differential backup. The differential backup is only valid with reference to the B-snapshot which represents the complete backup.

Let us term the Snapshot containing the above differential backup information as 'Differential backup Snapshot', or in short, D-snapshot.

6) Maintain the association information related to the D-snapshot in the Vdisk meta-data for B-snapshot, by maintaining an index to the Vdisk corresponding to the D-snapshot.

All the above mentioned fields in the Vdisk meta-data are maintained both on disk (for persistence as well as correctness and consistency) as well as in memory (for performance). Any Vdisk meta-data changes have to be reflected both in memory as well as on disk.

In Step 3) above, bits 'cleared' in the Sharing bitmap for St represent all of the segments that have been modified in the Original Vdisk V from the time Snapshot S0 was created until the current time (t). Hence, these bits, when 'reversed', represent the differential backup bitmap of St with reference to S0".

Additionally, in Step 3) above, online differential backup information for V with reference to S0 at time 't' has to be captured in St "at the time of creation of Snapshot St" and cannot be done later. This is because, sharing relationship between snapshots can change over time based on write operations on intermediate snapshots. This is because Snapshots are 'active' and hence are available for both read and write operations.

Usage Model of Snapshots for Backup Purposes

Snapshots may have a short useful life-span. They are created for the purpose of backup: to create standalone backup copies using the Snapshot image. Once that is done, the corresponding snapshot may be removed (i.e., deleted).

Snapclone is a special form of snapshot: it represents a complete snapshot, where a (usually background) copy process (sometimes called snapclone copy process) copies the Snapshot of the original Vdisk in its entirety onto the Snapclone Vdisk. Snapclones typically have a long life-span since they represent online complete backups.

Since no assumptions can be made about the length of time for which Snapshots are maintained, two cases will now be addressed below in which:

Created snapshots are not removed at all; or

Created snapshots may be removed, usually after an online standalone copy of the backup is created based on the snapshot.

For first case where snapshots are not removed, in a proposed embodiment, the snapshots themselves contain all the backup information: both for a complete backup and a differential backup. The second case, in which snapshots may be removed, is covered in later sections below.

Creating Online Standalone Backup Copies

Labeling the 'complete online standalone backup copy' with reference to which differential backups are taken as "B-archive" (also referred to as "baseline archive"), and the 'online standalone differential backup copy' as "D-archive" (also referred to as "differential archive"), a B-archive is created from a B-snapshot and a D-archive is created from a D-snapshot.

In the context of virtualized storage arrays, a B-archive can be created in the following steps:

Create a new Vdisk for B-archive, of size equal to the total size of the Vdisk for the corresponding B-Snapshot.

Start a copy operation in entirety, from beginning to end, whereby a read operation is issued on each successive segment of the Vdisk for B-Snapshot and copied (written to) the corresponding segment of the Vdisk for the B-archive.

Creating a D-archive requires creation of the corresponding Vdisk and associated meta-data to manage the D-archive, as briefly described by undertaking the following steps:

Copying the differential backup contents from the Vdisk of the corresponding D-snapshot;

Initializing Vdisk meta-data for this D-archive to contain: an 'differential backup bitmap', obtained from the corresponding D-snapshot; and a Vdisk index of the complete backup with reference to which this differential backup is taken; and Maintaining association information related to the D-archive in the B-archive, by maintaining an index to the Vdisk corresponding to the D-archive.

The disk space allocated to the D-archive is equal to the actual disk space occupied by the corresponding differential backup data i.e., the number of allocated segments in the Vdisk for D-archive will be equal to the number of bits set in its differential backup bitmap. For more details, see the section titled "Populating and accessing Differential backup data" below.

A two-way association between backup enabled snapshots and their corresponding D-archives/B-archives (as applicable) can also be maintained.

The above aspects related to D-archives/B-archives are together termed 'Archive' information. Additionally, on creation of a D-archive or B-archive, an attribute called 'Archive' attribute will be stored in their Vdisk meta-data. Checking for a D-archive/B-archive will be based on checking for this attribute in the corresponding Vdisk meta-data.

All of the abovementioned fields in the Vdisk meta-data are maintained both on disk (for persistence as well as correctness and consistency) as well as in memory (for performance). Any Vdisk meta-data changes have to be reflected both in memory as well as on disk.

B-archives and D-archives are read only in nature. They are available only for issuing read I/O operations. Any write I/O operations issued on B-archives and D-archives will be failed.

Accessing and Restoring from Backups in the New Method

A typical 'restore' from a backup is undertaken by the following steps:

Perform a restore of the complete backup; and

Perform a restore of the required differential backup on top of the complete backup In the context of virtualized storage arrays, the first step above can be implemented in one of two ways:

(A) If an 'online standalone complete backup copy' already exists, create its "snapclone". Let us designate the corresponding snapclone Vdisk created as Destination Vdisk (Vd).

(B) If an 'online standalone complete backup copy' does not exist, create a new Vdisk of size equal to the total size of the Vdisk for the corresponding B-Snapshot. Following this, start a copy operation in entirety, from beginning to end, whereby a read operation is issued on each successive segment of the Vdisk for B-Snapshot and copied (written to) the corresponding segment of the Vdisk just created. Lest us designate the Vdisk created as Destination Vdisk (Vd).

In a proposed embodiment, the second step above can be implemented as follows:

Implement a new "restore-backup" command that receives two arguments: Source Vdisk (Vs) that has the differential backup; and Destination Vdisk (Vd), that is already populated with a copy of complete backup, onto which differential backup image from Source Vdisk (Vs) has to be restored.

The restore-backup command copies only the segments in Source Vdisk (Vs) that have a bit set in the differential backup bitmap onto the corresponding segments in the Destination Vdisk (Vd).

Accessing Backups

A backup is typically also accessible for read-only purposes. This allows an administrator to view the backup contents and perform other administrative functions (e.g., to copy specific contents to other destinations). A good example is the read-only mount of a backup containing file-system data, following which some specific directories and files can be extracted to another specified destination (usually a directory in some existing and mounted file-system specified by the administrator).

In a proposed embodiment, complete backups (i.e., B-snapshots and B-archives, as applicable) are directly available for all read-only access (see also the section below entitled "Handling Regular I/O operations").

In conventional backup solutions, even differential backups can be viewed (in read-only mode). This is possible because, conventional backup solutions are file-based and not block-based. In block-based backup solutions, this is a limitation that cannot be addressed due to the technology involved. However, in reality, this feature is of very less practical value since the changed files alone without the context of the complete backup i.e., complete set of other related and associated files, is hardly useful or usable.

However, the proposed embodiments allows for a new and useful aspect related to differential backups that may not be available in conventional file-based backup schemes. Thus, a read-only view of the differential backup overlaid on top of the complete backup can be provided without having to do the restore of the corresponding backups. This is achieved in the following steps:

For a given differential backup, for every I/O Read request issued:
if this is on a segment corresponding to a set bit in differential backup bitmap, the corresponding contents are read from the differential backup; or
if this is on a segment corresponding to cleared bit in differential backup bitmap, the corresponding contents are read from the associated complete backup In one embodiment, this feature can be implemented and exposed via a new command in an administrative interface, "view-differential-backup", which is supplied with a single argument: Source Vdisk (Vs) that has the differential backup. In this case, the applicability of this command is first verified by checking if Vs is either an D-snapshot or D-archive. If not, the command is failed (since "view-differential-backup" is not a known command on regular snapshots).

In another embodiment, this feature can be implemented by creating a NEW Vdisk corresponding to the D-snapshot, over and above the Vdisk that gets created automatically for any snapshot created using the regular "create snapshot" interface, as it exists in prior art. The new Vdisk is also exposed to the user. In such a case, all READ operations issued on Source Vdisk (Vs) where Vs is either the separate Vdisk interface exposed specifically for the D-snapshot or it is an D-archive, will be processed as mentioned above. There is no need to have a separate "view-differential-backup" command.

It will be appreciated that the above details for accessing and restoring from backups are equally applicable both to online standalone backup copies as well as the backup image accessible directly via corresponding Snapshots that have backup information.

The details related to accessing backup are applicable on either an D-snapshot/D-archive where the corresponding "baseline" is either a B-snapshot/B-archive. The user is insulated from having to know the Baseline that is being used for the corresponding complete backup when either the B-snapshot/B-archive is being used.

Usage Model for Periodic Backups

Periodic backups in organizations and enterprises are usually undertaken with the following regularity: monthly (say, first day of every month), weekly (say, every Sunday) provided it does not fall on the day of monthly backup; and daily (say, midnight every day) provided it does not fall either on the day of weekly backup or monthly backup.

Monthly backups are typically re-cycled. In other words, older backups are removed when newer ones are created. The choice as to how old a backup may be before it may be removed is usually determined according to the needs of the organization/enterprise and may be a user configurable value. Also, the deletion process may be undertaken periodically. Such periodicity may range from once in every few months to once in every few years, for example. Similarly, weekly backups can be re-cycled once every few weeks or months, while daily backups may be re-cycled every few days or weeks.

Removal of monthly backups results in the removal of associated weekly backups as well. Removal of weekly backups results in the removal of associated daily backups as well. Typically, all the backups taken are labeled and catalogued.

The above backup management details are not covered in any detail here since they are well known for most commercial backup solutions. However, aspects related to creation and removal of backups are detailed below. This corresponds to creation and removal of B-snapshots and D-snapshots (in the case of backup enabled snapshots) and B-archives and D-archives (for online standalone backup copies) in the proposed embodiments. In general: B-snapshots and B-archives correspond to complete backups; and D-snapshots and D-archives correspond to differential backups.

Administrative Interface for Online Differential Backup

The interface to administer an online differential backup is based on enhancing the existing administrative interface for snapshots, which usually has three major categories: Create snapshot; Remove snapshot; and Administer Snapshot. These are made available via snapshot related options to the generic interface "Manage Virtual Disks (Vdisks)", with the corresponding categories being "Create Vdisk", "Remove Vdisk" and "Administer Vdisk". In many cases, the snapshot related interface is exactly the same as the Vdisk interface e.g., in most cases, the interface to remove a snapshot can be identical to remove a Vdisk.

Here, an existing create snapshot interface is enhanced to include an additional option (say "Bkup") to indicate the need to generate backup information.

An additional option (say "Full") to the existing create snapshot interface can be used to indicate that the snapshot being created is a B-snapshot corresponding to a complete backup, whereas another option (say "Incr") can be used to indicate that the snapshot being created is an D-snapshot which will contain only differential backup information (only one of these options can be used i.e., 'Full' and 'Incr' are mutually exclusive). Thus, the 'Bkup' option is accompanied by the additional option ('Full' or 'Incr'). In other words, using only 'Bkup' is in error since it is meaningless all by itself. Both the above options are specified at the time of creation of snapshot.

An option (say "Preserve") indicates that a B-archive or D-archive (as applicable) is created automatically prior to: either, the removal of the corresponding D-snapshot; or issuing writes on a D-snapshot on segments containing backup information The administrative options mentioned above also result in corresponding attributes being stored in the meta-data for the Snapshot Vdisks. These are termed collectively as 'Bkup' attribute. Checking if a snapshot is backup enabled can then be based on the existence of 'Bkup' attribute (for example, if a Vdisk does not have this attribute, it does not have anything to do with backups, be it differential or complete). This attribute along with differential backup information constitutes 'Bkup' information.

The 'Preserve' option can only be specified for a backup enabled Snapshot. In other words, it can only be specified on a Snapshot previously created with the 'Bkup' command option. This option can be specified in the following ways: Either during the creation of such snapshots, as part of the existing create snapshot interface, or at a later time on such snapshots, as part of the existing administer snapshot interface.

Creation of a D-archive or B-archive (as applicable) can be triggered on any existing backup enabled snapshot on explicit request by the administrator at any time using an additional option (say 'Archive') to the existing administer snapshot interface.

The existing remove snapshot interface is enhanced to include an additional option (say 'Archive') for backup enabled snapshots. If 'Archive' is specified, the associated D-archive and B-archive (as applicable) is removed prior to the removal of the snapshot. If 'Archive' is not specified, the associated D-archive and B-archive (as applicable) is not removed.

The generic remove Vdisk interface when issued directly on Vdisks for D-archives and B-archives results in removal of the corresponding D-archives and B-archives.

The administer snapshot interface is enhanced with new options (say 'RemoveBkup' and 'RemoveArchive') for backup enabled snapshots with the following effect. The 'RemoveBkup' option removes only the 'Bkup' information associated with the specified snapshot. 'Archive' information is not removed. The 'RemoveArchive' option removes only the 'Archive' information. The 'Bkup' information is not removed. Specifying both 'RemoveArchive' and 'RemoveBkup' options (in any order) results in removing the 'Archive' information followed by 'Bkup' information.

Note, on removal of 'Bkup' information in a backup enabled snapshot, it becomes the same as a regular snapshot.

Embodiments introduce two new Backup administration commands: "restore-backup" and "view-differential-backup". These are described in more detail in the section entitled "Accessing and Restoring from Backups in the new method".

Online Differential Backup Operations Triggered by Administrative Interface

Figure 5:
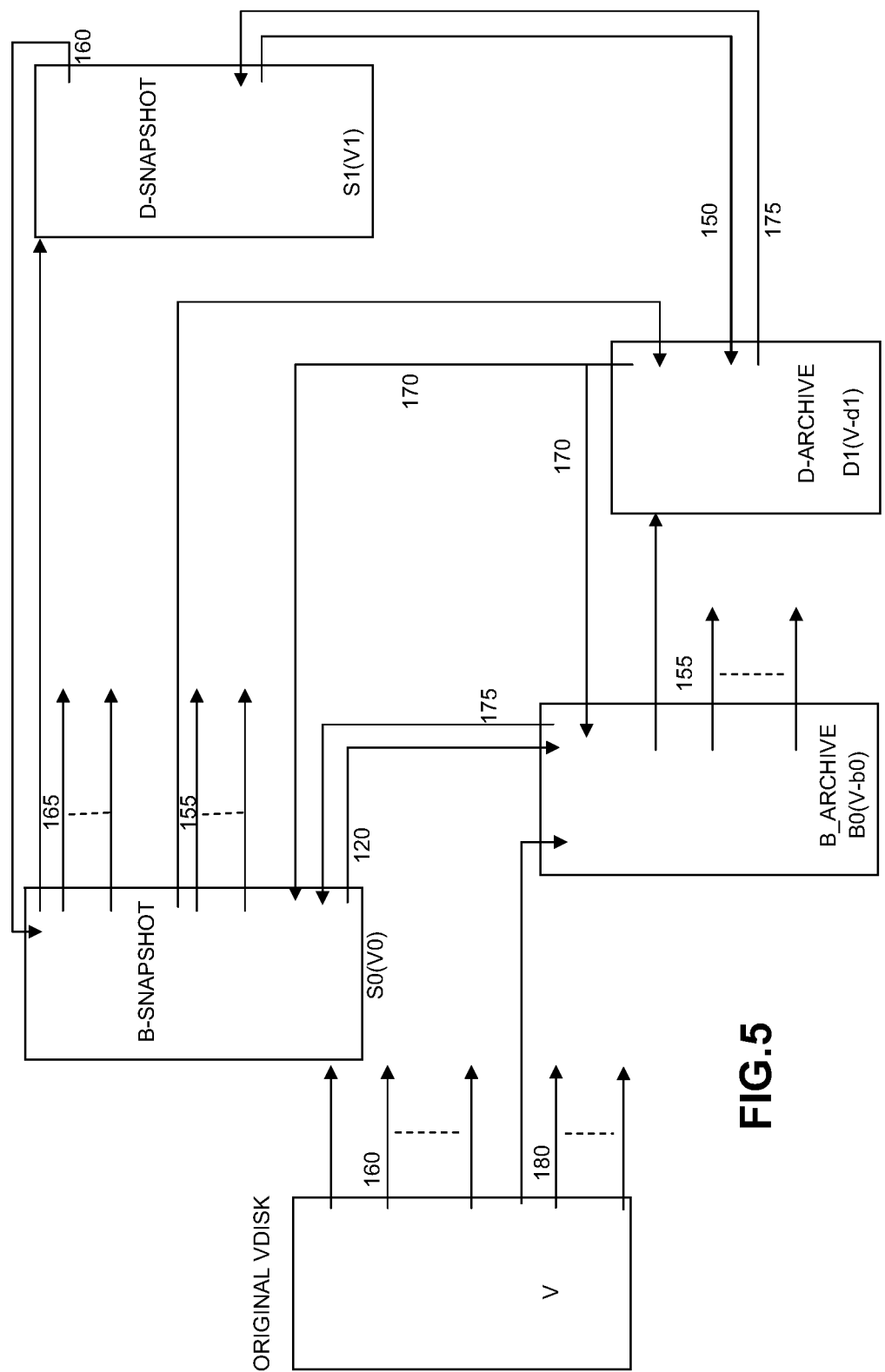
FIG. 5 depicts data storage structures in accordance with an embodiment.

Referring now to FIG. 5, a diagrammatic representation of the data structures involved in implementing these operations is shown.

Create Snapshots

As stated earlier, differential backup is possible with reference to B-snapshot. Hence, an attempt to specify differential backup (using 'Bkup Incr' option) as part of create snapshot without a prior creation of the corresponding B-snapshot (using 'Bkup Full' option) is in error, and can be handled in one of 2 ways: either fail the snapshot creation operation, or, proceed with creation of snapshot without creating any backup information (by completely ignoring the backup options)

The specific error handling is configurable and is based on administrative settings.

B-snapshot and its associated D-snapshots form a set. This association information is maintained in Vdisk meta-data for the corresponding Vdisks (V0 and V1, V2, . . . , Vn respectively). As and when backup enabled Snapshots are created, the corresponding associations are created and maintained as described below.

For the creation of a B-snapshot (using the 'Bkup Full' option), the original Vdisk (V) maintains, in its meta-data, an ordered set of B-snapshot-indices 160 corresponding to Vdisks for baseline snapshots created. The ordering is based on the creation time of the corresponding baseline snapshots. On creation of a specific B-snapshot (say S0), its Vdisk index (V0) is appended to this time-ordered ordered-set-of-B-snapshot-indices. The latest B-snapshot created is called the "current B-snapshot". All D-snapshots created are always with reference to the "current B-snapshot". The Vdisk for B-snapshot also contains D-snapshot-index-list 165 in its meta-data to track associated D-snapshots. On creation, D-snapshot-index-list is initialized to empty.

Two other fields, "own-archive-index" 150 and "D-archive-index-list" 155, are also initialized to empty (the use of these fields is covered in detail in Section "Details of creating Online Standalone Backup Copies in the new method")

For the creation of an D-snapshot (using 'Bkup Incr' option), the Vdisk index corresponding to the current B-snapshot (i.e. latest B-snapshot) is stored in the meta-data of the Vdisk for the D-snapshot created (and hereinafter referred to as the "B-snapshot-index" 160 field). Another field "own-archive-index" is initialized to empty (use of this field is covered in Section "Details of creating Online Standalone Backup Copies"). Finally, D-snapshot-index-list 165 in the Vdisk meta-data for the latest B-snapshot (in terms of creation time) is updated with the Vdisk index for this D-snapshot. Note that Vdisk index for the "current B-snapshot" (i.e., latest B-snapshot) is maintained in V.

Various other actions related to maintaining differential backup information have already been covered in detail in the section entitled "Generating Online Differential backup information". An important action among them is storing the differential backup bitmap in the Vdisk meta-data for the D-snapshot created.

Administer Snapshots

If 'Archive' option is specified on a backup enabled snapshot:
 If this is a B-snapshot, a corresponding B-archive is created, if one does not exist already
 If this is a D-snapshot, a corresponding D-archive is created, if one does not exist already Note that checking for the existence of a corresponding D-archive/B-archive is based on the value in own-archive-index field in Vdisk meta-data for the corresponding D-snapshot/B-snapshot. For details related to this field as also the exact steps involved in creating B-archives/D-archives (as applicable) (see the section entitled "Details of creating Online Standalone Backup Copies").

Remove Snapshots

If the 'Archive' option is not specified, the following is done for backup enabled snapshots prior to their removal: Remove only 'Bkup' information. However, if the 'Archive' option is specified, the following is done for backup enabled snapshots prior to their removal: Remove 'Archive' and 'Bkup' information.

The removal of Original Vdisk (V) results in removal of all B-snapshots associated with it, and the removal of B-snapshot results in the removal of all associated D-snapshots. In general, removal of a Vdisk results in removal of all associated snapshots that have a dependent "sharing" relationship with this Vdisk.

New Backup Administration Commands

There are some additional aspects not covered above, as will now be described below.

Corresponding to the argument Source Vdisk (Vs) (that has the differential backup), "restore-backup" issues a special read request called differential read request on it, and "view-differential-backup" issues a special read request called backup read request on it. Both of these special read requests have arguments similar to a general read request directed to a target disk device: <I/O Offset, I/O Length>. As related to Vs, both restore-backup and view-differential-backup issue the special read requests on Vs from beginning to end.

In the case of restore-backup, some pre-processing is undertaken based on the differential backup bitmap associated with Vs. The differential read request is issued only on those segments with bits set in the differential backup bitmap, while segments that have cleared bits are skipped. The <I/O offset, I/O Length> to be used for differential read request on Vs is calculated based on the corresponding (allocated and valid) segment on which it has to be issued. On successful I/O completion, this very same <I/O offset, I/O length> pair is used for the write request (to be) issued on the corresponding Destination VDisk (Vd) containing the complete backup copy. The data written is the data that was just read-in successfully. This is done since restore-backup is used to restore the differential backup on top of a complete backup already restored.

The processing related to differential read request and backup read request is covered in the section "Accessing Differential Backup Data".

Remove 'Archive' and 'Bkup' Information from Backup Enabled Snapshots

To remove only 'Bkup' information for a D-snapshot, the following steps are executed:
1) If the 'Preserve' attribute is set on this D-snapshot, a D-archive corresponding to this D-snapshot is first created, if one does not exist already. See Section titled "Details of creating Online Standalone Backup Copies in the new method" for the related details.
2) The associated B-snapshot (whose Vdisk index is stored in the field B-snapshot-index in the Vdisk for this D-snapshot) will remove its Vdisk reference (i.e., index) to this D-snapshot from its D-snapshot-index-list in its Vdisk meta-data.
3) If a corresponding D-archive does exist, clear the own-snapshot-index 175 in the corresponding D-archive. Note that this check is undertaken based on the value of own-archive-index entry in the Vdisk meta-data for the D-snapshot. For the related details, as well as details related to usage of own-snapshot-index 175 described above, see the section entitle "Details of creating Online Standalone Backup Copies".
4) Clear differential backup information from D-snapshot (see the corresponding sub-section below for the exact steps)
5) Clear the 'Bkup' attribute in the Vdisk meta-data for this D-snapshot To remove only 'Bkup' information for a B-snapshot, the following steps are executed:
1) If the 'Preserve' attribute is set on this B-snapshot, a B-archive corresponding to this B-snapshot is first created, if one does not exist already. See the section entitled "Details of creating Online Standalone Backup Copies" for the related details.
2) If a B-archive does not exist, remove all existing D-archives associated with this B-snapshot. Note that this step uses the following values in the meta-data for the Vdisk for B-snapshot: own-archive-index is empty; and D-archive-index-list points to the Vdisks corresponding to the D-archives already created. See the section entitle "Details of creating Online Standalone Backup Copies" for related details. Also, the steps for D-archive removal are listed in the section entitle "Details of removal of Online Standalone Backup Copies".
3) If a B-archive does exist (as indicated by own-archive-index 170 in Vdisk meta-data for this B-snapshot), for each of the D-snapshot Vdisks in D-snapshot-index-list 165 in Vdisk meta-data for this B-snapshot, it is checked if the 'Preserve' attribute is set in the Vdisk meta-data for this D-snapshot. The corresponding D-archive is first created, if one does not exist already. The own-snapshot-index 175 in the corresponding B-archive is then cleared.
4) Clear differential backup information from B-snapshot (see the corresponding sub-section below for more detail).
5) Clear 'Bkup' attribute in the Vdisk meta-data for this B-snapshot.
6) Remove the index entry for the Vdisk corresponding to this B-snapshot from ordered-set-of-B-snapshot-indices 160 maintained in the meta-data of the Original Vdisk (V)

Note that on removal of 'Bkup' information in a backup enabled snapshot, it becomes the same as regular snapshots.

To Remove 'Archive' and 'Bkup' Information

If this is a D-snapshot, the following steps are executed:
1) If a corresponding D-archive does exist, this D-archive is removed. For the steps involved in removing this D-archive, see the section entitled "Details of removal of Online Standalone Backup Copies".
2) The associated B-snapshot (whose Vdisk index is stored in the field B-snapshot-index in the Vdisk for this D-snapshot) will remove its Vdisk reference (i.e., index) to this D-snapshot from its D-snapshot-index-list in its Vdisk meta-data.
3) Clear differential backup information from D-snapshot (see the corresponding sub-section below for the exact steps).
4) Clear 'Bkup' attribute in the Vdisk meta-data for this D-snapshot If this is a B-snapshot, the following steps are executed:
1) If a B-archive does not exist, remove all existing D-archives associated with this B-snapshot.
2) If a B-archive does exist (as indicated by own-archive-index in Vdisk meta-data for this B-snapshot), remove this B-archive (the section entitled "Details of removal of Online Standalone Backup Copies" provides more details about the steps involved).
3) Clear differential backup information from B-snapshot (see corresponding sub-section below for the exact steps).
4) Clear 'Bkup' attribute in the Vdisk meta-data for this B-snapshot.
5) Remove the index entry for the Vdisk corresponding to this B-snapshot from ordered-set-of-B-snapshot-indices 160 maintained in the meta-data of the Original Vdisk (V).

It is noted that a D-archive/B-archive (as applicable) created a part of processing 'Preserve' attribute involves a snap-clone copy process that copies the segments containing backup information from the backup enabled snapshot.

To Remove Only 'Archive' Information

If this is a D-snapshot, Step 1) for D-snapshot listed in the corresponding sub-section above entitled "To Remove 'Archive' and 'Bkup' information" is executed.

If this is a B-snapshot, steps 1) and 2) listed for B-snapshot in the sub-section above entitled "To Remove 'Archive' and 'Bkup' information" are executed.

Clearing Differential Backup Information from D-Snapshot

This involves the following operations on D-snapshot's Vdisk meta-data: B-snapshot-index is cleared; own-archive-index is cleared; and the 'differential backup bitmap' is cleared (by setting all bits to 0).

Clearing Differential Backup Information from B-Snapshot

This corresponds to clearing differential backup information in all the associated D-snapshots. This is done in the following steps:
1) Scan through D-snapshot-index-list 165 maintained in the Vdisk meta-data of this B-snapshot.

2) For each of those Vdisk indices, do the following steps: access the corresponding D-snapshot; if a corresponding D-archive does exist, clear the own-snapshot-index 175 in the corresponding D-archive; clear differential backup information from D-snapshot (see corresponding sub-section above for the exact steps); and remove the corresponding Vdisk reference (i.e., index) to this D-snapshot from D-snapshot-index-list in the Vdisk meta-data of this B-snapshot Details of Creating Online Standalone Backup Copies It may be necessary to create online Standalone Backup copies of backup enabled snapshots under various scenarios, as described earlier. Specifically, the B-archive for the B-snapshot (S0) is named as B0. Based on the differential backup information in S1, S2, . . . , Sn (the various D-snapshots associated with S0), corresponding D-archives have to be created. Let us name the corresponding D-archives as D1, D2, . . . , In respectively.

The creation of B0 results in Vdisk V-b0.

For the creation of a B-archive, the original Vdisk (V) maintains, in its meta-data, an ordered set of B-archive-indices 180 corresponding to Vdisks for baseline archives created. The ordering is based on the creation time of the corresponding baseline archives. On creation of a specific B-archive (say B0), its Vdisk index (V-b0) is appended to this time-ordered ordered-set-of-B-archive-indices. The latest B-archive created (and appended) is called the "current B-archive". This corresponds to the latest baseline archive associated with the Original Vdisk (V).

It must be noted that the "current B-archive" is of value (and hence useful) only when the original Vdisk (V) has no associated B-snapshots (say, by a previous snapshot remove operation on all the B-snapshots associated with V). When there exist B-snapshots associated with original Vdisk V, "current backup" is always based on "current B-snapshot" in V; "current B-archive" is ignored in such a case.

Creating a D-archive (say D1) requires creation of the corresponding Vdisk (say V-d1), which involves the following steps:

Copying the Differential backup 'contents' into V-d1 from the Vdisk V1 for the corresponding D-snapshot (S1); and Initializing Vdisk meta-data for V-d1 to contain an 'differential backup bitmap' associated with S1, and a Vdisk index of the complete backup with reference to which this differential backup is taken (this field is hereinafter referred to as the "B-archive-index" 170).

The disk space allocated to V-d1 is equal to the actual disk space occupied by the corresponding differential backup data i.e., the number of allocated segments in V-d1 will be equal to the number of bits set in its 'differential backup bitmap'. See the section entitled "Populating and accessing Differential backup data" for further details.

The association information related to the D-archive created is maintained in the B-archive: The meta-data for V-b0 contains the field D-archive-index-list to track Vdisks for D-archives created (V-d1, V-d2, . . . , V-dn respectively). This is initially empty.

A field called own-archive-index is maintained in the Vdisk meta-data for the backup enabled snapshot to track the corresponding B-archive or D-archive, as applicable. This field is initialized to empty on creation of the backup enabled snapshot.

Similarly, a field called own-snapshot-index 175 is maintained in the Vdisk meta-data of the B-archive or D-archive created to maintain the association with the corresponding snapshot. This field stores the Vdisk index for the snapshot that created this B-archive or D-archive.

B0 and D1, D2, . . . , In form a set. As and when these online standalone Backup Copies are created, the corresponding associations are created and maintained in the Vdisk meta-data for these Vdisks (V-b0 and V-d1, V-d2, . . . , V-dn respectively) as described below.

The B-archive-index field in Vdisk meta-data for D-archive is initially empty.

Associations for D-archive (say D1) are created in the following steps:
1) The own-archive-index entry in the meta-data for V1 is updated to correspond to V-d1
2) The own-snapshot-index 175 field in the meta-data for V-d1 is updated to contain the Vdisk index for V1
3) If the corresponding B-archive (say B0) does exist: B-archive-index field in meta-data for Vdisk for D1 (V:D1) is initialized with index value of Vdisk for B0 (V-b0); and an index to V-d1 is added in D-archive-index-list maintained in V-b0's meta-data. The above check is based on value of own-archive-index in Vdisk meta-data for V0.
4) If the corresponding B-archive (i.e., B0) does not exist (i.e., the value of own-archive-index in Vdisk meta-data for V0 is empty), the B-archive-index field in meta-data for V-d1 needs to be initialized to a value that allows proper association. This is handled as follows: B-archive-index field in meta-data for V-d1 is initialized with the Vdisk index value for V0 (the Vdisk for B-snapshot); and V0 will also maintain a D-archive-index-list (to correspond to V-d1, V-d2, . . . , V-dn) in its meta-data. This is initially empty. On creation of V-d1, V-d2 etc before V-b0 is created (i.e., own-archive-index in V0 is empty), the D-archive-index-list in meta-data for V0 is updated with the indices to V-d1, V-d2 etc respectively.

It is possible to have D-archives created before B-archive (B0) is created. This happens if, before B0 is created: the administrator initiates the creation of D-archive (say D1); the administrator initiates removal of the corresponding D-snapshot (S1), and, S1 has 'Preserve' option set on it; or users issue writes on D-snapshot (S1) on segments containing backup information, and, S1 has 'Preserve' option set on it.

Associations for a B-Archive (B0) are created in the following steps:
1) The own-archive-index entry in the meta-data for V0 is updated to correspond to V-b0.
2) The own-snapshot-index 175 field in the meta-data for V-b0 is updated to contain the Vdisk index for V0.
3) For all associated D-archives that already exist (available from the D-archive-index-list in meta-data for V0), the D-archive-index-list in Vdisk meta-data of V-b0 is updated with the indices of the corresponding Vdisks for the existing D-archives D1, D2, . . . , In (i.e., V-d1, V-d2, . . . , V-dn respectively), and the B-archive-index field in meta-data for the Vdisks for D-archives is initialized with the index value for Vdisk V-b0. It is noted that if no D-archives exist at the time of creation of V-b0, D-archive-index-list in Vdisk meta-data for V-b0 is initialized to empty.
4) The D-archive-index-list in meta-data for V0 is cleared (i.e., initialized to empty).

Details of Removal of Online Standalone Backup Copies

For each D-archive/B-archive being removed, any active snapclone copy process directly associated with the D-archive/B-archive (which usually runs in the background) is terminated. Once that is done, the below steps are executed.

A D-archive (say D1, D2, ..., In) is removed in the following steps:
1) If the corresponding B-archive (say V-b0) exists, V-b0 will remove the index entry for the corresponding Vdisk being removed (V-d1, V-d2, ..., V-dn respectively) from its D-archive-index-list in its meta-data.
2) If the corresponding B-archive (say V-b0) does not exist, each of V-d1, V-d2, ..., V-dn respectively will has a reference to V0 (the associated B-snapshot) in its meta-data (and-not-V-b0). Hence, the corresponding entry for this Vdisk (being removed) will be removed from D-archive-index-list in V0's meta-data
3) If the corresponding D-snapshot (say S1, ..., Sn) exists, the own-archive-index entry in meta-data for V1, V2 ..., Vn (the Vdisk for D1, D2 ..., In respectively) is cleared/removed. It is noted that the above check is based on value of own-snapshot-index 175 field in meta-data for V-d1, V-d2, ..., V-dn respectively.
4) V-d1, V-d2, ..., V-dn, the Vdisk corresponding to D1, D2 ..., In respectively, as applicable, is removed.

A B-archive (say B0) is removed in the following steps:
1) If the corresponding B-snapshot (say S0) does not exist, all of the associated D-archives (maintained in D-archive-index-list in meta-data of V-b0) will be removed prior to removal of B0. The above check is based on value of own-snapshot-index 175 field in meta-data for V-b0.
2) If the corresponding B-snapshot (say S0) does exist, for all associated D-archives that already exist (available from the D-archive-index-list in meta-data for V-b0): the D-archive-index-list in Vdisk meta-data of V0 (the B-snapshot) is updated with the indices of the corresponding Vdisks for the existing D-archives D1, D2, ..., In (i.e., V-d1, V-d2, ..., V-dn respectively); and the B-archive-index field in meta-data for the Vdisks for D-archives is initialized with the index value for Vdisk V0. The own-archive-index entry in meta-data for V0 (the Vdisk for S0) is then cleared/removed
3) V-b0, the Vdisk corresponding to B-archive B0, is removed.

Populating and Accessing Differential Backup Data

Figure 6:
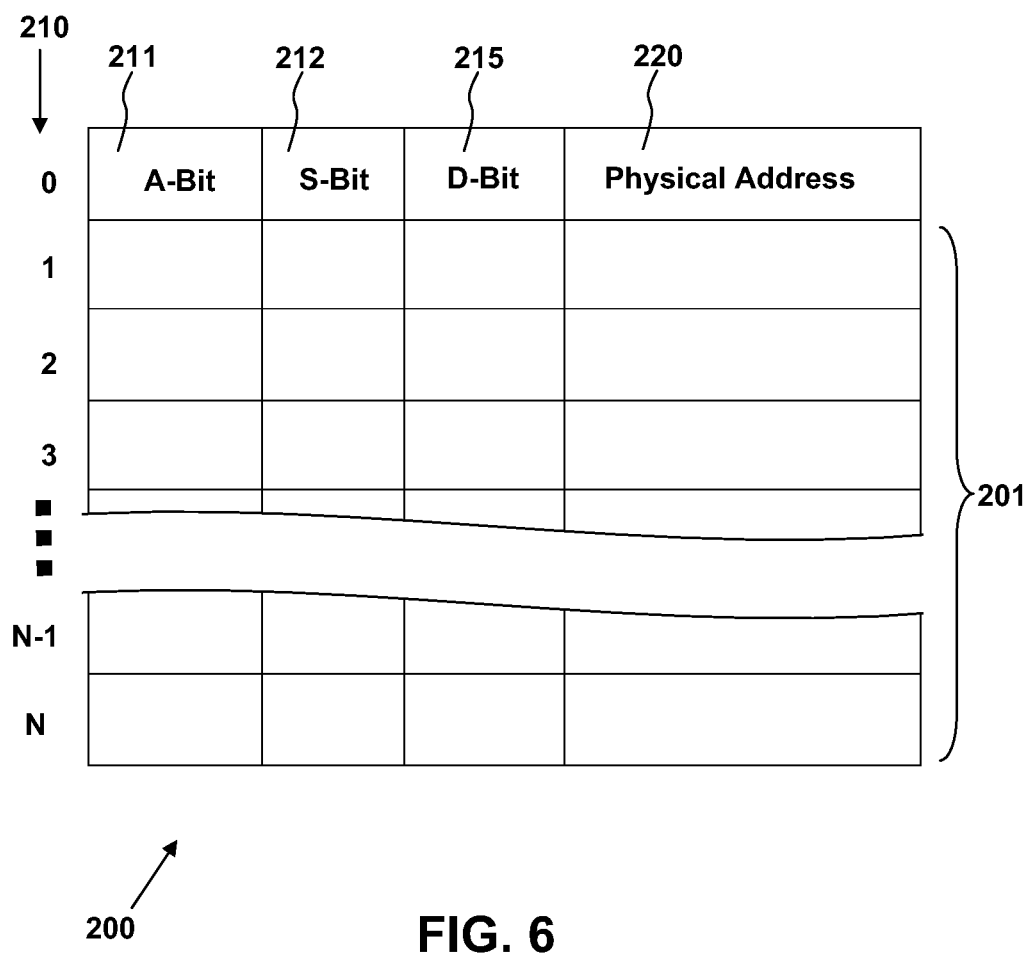
FIG. 6 depicts a segment mapping table in accordance with an embodiment.

FIG. 6 represents the segment mapping table (also called mapping table) involved in populating and accessing differential backup data.

With reference to FIG. 6, the entire mapping table 200 comprises a plurality of entries 201. Segment Numbers 210 in a Vdisk are arranged in their logical ordering. Physical Addresses 220 in differential backup map the segment number 210 to the physical location where the corresponding data is located. The Physical Address 220 consists of a set of fields. These are described in FIGS. 4A, 4B and 4C.

Figure 7A:
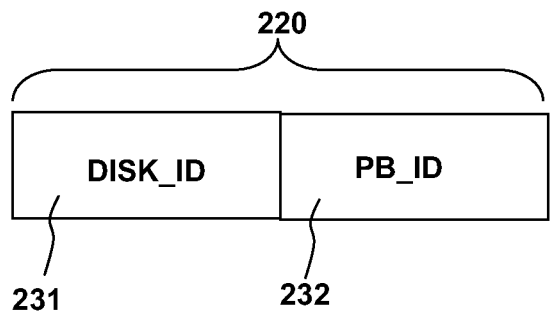
FIG. 7A shows an embodiment of the physical address field in the segment mapping table of FIG. 3.

In the embodiment of FIG. 7A, a physical address 220 comprises an address of the disk partition 231, named DISK_ID, and an address of the physical block 232, named PB_ID. In such an embodiment, where the amount of contiguous disk space allocated on disk Disk_ID starting at PB_ID exactly matches the size of the segment, this physical addressing suffices.

Figure 7B:
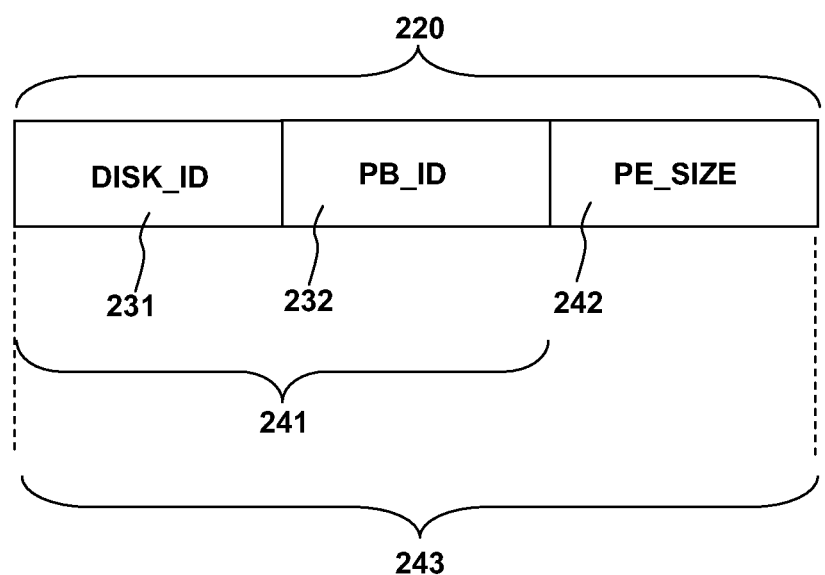
FIG. 7B shows another embodiment of the physical address field in the segment mapping table of FIG. 3.

However, in other embodiments where physically contiguous disk space that matches segment size may not be available at address PB_ID, and also for other reasons related to I/O performance as well as high availability of underlying data, more flexible schemes are needed. In light of this, <DISK_ID, PB_ID> is defined as a Physical Address Unit (PAU) 241, as shown in FIG. 7B. To allow for flexibility, another field PE_SIZE 242 is associated with PAU to form a Physical Extent (PE) 243. In the cases where PE_SIZE matches the size of the segment, a single PE will suffice to map the Logical Segment to the corresponding physical space allocated. However, if PE_SIZE is smaller than the size of the segment, as is the case in many embodiments, then, more than one PE needs to be allocated to map the segment to the corresponding physical space allocated.

In order to allow efficient disk space allocation and management, the PE_SIZE is usually configured to a fixed value, thereby resulting in fixed size PE's. In such a case, a segment is mapped to a fixed number of PE's. As an example, in some embodiments as shown in FIG. 7C, a segment has a size of 1 MByte, PE 243 has a size (PE_SIZE) of 256 Kbytes, wherein one segment 210 is mapped to four PEs 251.

The mechanism of using fixed size PE's is considered as being preferred. In such an embodiment, the physical address field in the mapping table entry for a given (single) segment consists of a (set of) fixed number of (fixed size) PE's, with PE numbering starting from 0. The physical translation corresponding to Addressing various offsets within the segment is: <PE Number, PE offset>, where: PE Number is obtained by integer division without round-off of the Offset within the segment and size of PE i.e., (Offset within the segment)/(PE_SIZE); and PE offset (i.e., offset within the PE) is calculated using Offset within the segment modulo size of PE i.e., (Offset within the segment) % (PE_SIZE), where "%" represents the modulo operation.

Based on the I/O size involved, access to a single segment may span across multiple PE's. In such a case, a single I/O on a given segment is deemed complete when I/O's on all the underlying PE's over which the I/O on the segment spans are completed successfully. Generating and managing those I/O's involve physical translation similar to what was described in the previous paragraph. Since this is covered in great detail in U.S. Pat. No. 6,915,397, the same will not be repeated here.

Figure 7C:
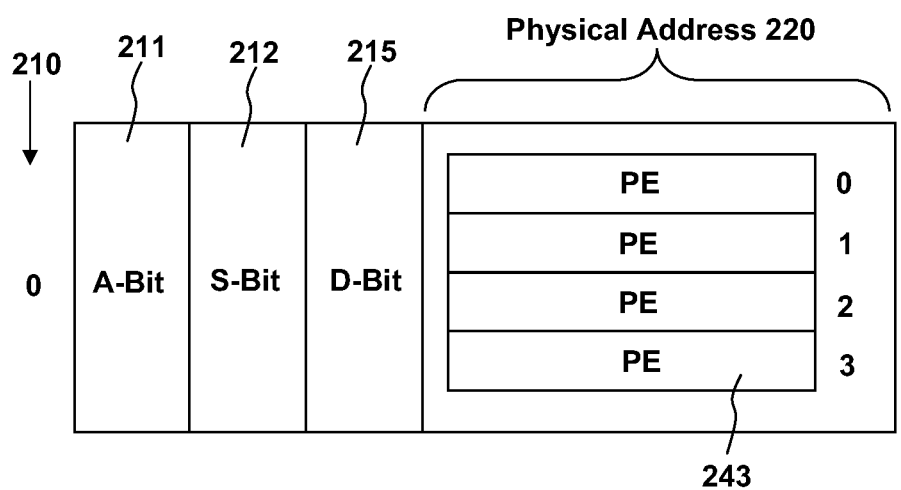
FIG. 7C depicts a segment mapping table according to another embodiment.

Referring to FIGS. 6 and 7C, a bit field called Allocation Bit 211 is named A-Bit and has a binary value. A value of zero "0" indicates that no allocation of physical disk space has been done for this segment. A value of one "1" indicates the completion of allocation of corresponding disk space, whereby the physical address 220 contains the corresponding mapping physical address for this segment.

A bit field called Sharing Bit 212 is named S-Bit and has a binary value. A value of zero "0" indicates that the data for this segment is directly located in disk space allocated for this Vdisk. A value of one "1" indicates that the data for this segment is actually located in the associated original Vdisk based on which this Vdisk was created, for example for a D-archive (V-D1), the associated original Vdisk is the corresponding D-snapshot (V1), and for the B-archive (V-b0), it is the corresponding B-snapshot (V0). For the B-snapshot (V0), it is the Original Vdisk (V), and for the D-snapshot (V1), it is the Original Vdisk (V).

A bit field introduced in an embodiment is the Differential backup Bit 215, named D-bit. D-bit has a binary value and represents the presence (by a bit value of one "1", also called bit set) or absence (by a bit value of zero "0", also called bit cleared) of differential backup information in the corresponding segment. D-bits for all the segments represent the differential backup bitmap.

The entire Vdisk space, as already described, is divided into equal-sized segments, with one entry per segment 201 in the mapping table 200. At the time of creation of Vdisk, the process of mapping table initialization ensures that all the entries are set to value zero "0" to represent an initial state. Based on the type of Vdisks, certain entries are additionally set to suitable values during the process of mapping table initialization, as covered in the remaining sub-sections below.

The above mapping table is maintained both in memory (for efficiency) and on disk (for persistence, correctness and consistency). After the completion of the mapping table initialization process, any change to any table entry results in updates to both the copy in memory as well as the copy on disk. During mapping table initialization process, the entries made are not considered updates. Since this is an initialization process, all the initialization is done first in memory, and as part of completion of initialization, the mapping table is written to the disk copy in one shot.

The disk representation of the mapping table is usually quite different from the in-memory copy. This is primarily driven by space and time efficiency considerations while accessing and storing the disk copy. In one approach, the D-bits for the entries in the mapping table correspond to a sequence of contiguous bits maintained on disk. As an example, for 256*1024 segment entries in the mapping table, the on-disk representation of the D-bits is a 32 Kbytes contiguous disk space in Vdisk meta-data, as described in the below example.

Total size of Original Vdisk V=256 GB
Total size of Snapshot Vdisk V0 (corresponding to S0)=256 GB
Segment size=1 MB Size of Differential backup Bitmap generated from V0 =

$$\text{No. of segments} = \frac{\text{Total size of } V0}{\text{segment size}} = \frac{256 \text{ GB}}{1 \text{ MB}} =$$

$$256 * 1024 \text{ Bits} = 32 \text{ Kbytes} \left(\frac{256 \text{ KBits}}{8}\right) [1 \text{ Byte} = 8 \text{ bits}]$$

Types of Snapshots, their Vdisk Initialization, and Management.

A space efficient snapshot allocates PEs as needed to effect I/O Write operations. If sufficient PEs are not available, the snapshot operation may be terminated and the snapshot lost. In contrast, a traditional snapshot is a space inefficient snapshot: the PEs are pre-allocated up-front, with the total disk space allocated for the snapshot being equal to (or more than) the size of the original Virtual Disk.

With reference to the Mapping table, in the case of space inefficient snapshots, a prior step of allocation (also called pre-allocation) is done for all the segments involved resulting in A-bit entries being set to 1 in the corresponding entries. As a result, the mapping physical address in the corresponding entries in the mapping table point to PEs on the disk space allocated for this snapshot. This is usually done a priori at the time of creation of the snapshot Vdisk itself, as part of the process of mapping table initialization described earlier, much before the Vdisk is even enabled for access and for issuing read/write requests. In the case of space efficient snapshots, this allocation is done on demand, and not done a priori.

In both the cases, the S-bit in all the entries in the Mapping table is set to 1 as part of the process of mapping table initialization. This is done to ensure that only those segments that have been written to (i.e., have changed) in the original Virtual Disk since the creation of the snapshot will result in physical address pointing to PEs allocated in the snapshot in the corresponding mapping table entries (at which time, the S-bit in the mapping table entry for the corresponding segment is set to 0).

In the case of space efficient snapshots, an on demand disk space allocation is done to fill-up the corresponding physical address in the mapping table entry for this segment, followed by setting the A-bit to 1. In the case of space inefficient snapshots, all these are already done as part of initialization itself, right at the time of creation of the corresponding Vdisk For segments unchanged since the creation of this snapshot, the data is located on the corresponding segment in the original Virtual Disk (until, and only until, the segment on the original Virtual Disk is updated i.e., changed).

Snapclones are Space inefficient Snapshots (similar to Traditional snapshots). Hence, the Mapping table initialization and later updates described above apply to snapclone Vdisks as well, with an additional aspect involved: a (usually background) copy process copies the unchanged segments from the original Virtual Disk to the snapclone Vdisk (the changed segments are already copied in the context of processing the I/O write operation that effected the change). On completion of the copy of the segment, the S-bit in the mapping table entry for this segment is set to 0.

Once all the S-bits associated with a snapshot (including snapclone) are cleared, it no longer has the "sharing" relationship with the original Vdisk from which the snapshot was created. Hence, sharing bitmap directly associated with this snapshot is removed. In the case of snapclone, the copy process terminates. From this point onwards, the snapshot can exist independently. Removal of a Vdisk results in removal of all associated snapshots that still have a dependent "sharing" relationship with the Vdisk being removed.

Populating Differential Backup Data in a D-Archive

As explained above, the disk space allocated for a D-archive is equal to the size of the actual differential backup data in terms of number of segments. This is calculated by simply counting the number of set bits in its differential backup bitmap and multiplying that by the size of a segment. This implies the following:

Only segments having a corresponding bit set in the differential backup bitmap will be "allocated" space and stored on the Vdisk for D-archive; and The segments containing differential backup data must be mapped to the Physical Addresses corresponding to the disk space actually allocated to them, in order to store the differential backup data on the D-archive Vdisk.

Step 1

Create the D-archive as a space efficient snapshot of the corresponding D-snapshot: the required space allocation for each segment is carved out of the disk space already allocated for the D-archive.

Step 2

Modify the process of initialization of mapping table 200 during creation of D-archive (covered in previous two sub-sections), in the following steps:

For each segment number 210, access corresponding bit in differential backup bitmap to obtain its value (B). If bit value B is 1, then in the entry 201 corresponding to this segment number 210 in the mapping table 200, set the D-bit (215), to value one "1". If bit value B is 0, then in the entry 201 corresponding to this segment number 210 in the mapping table 200, clear the S-Bit 212, to value zero "0".

Step 3

For each D-archive being created, start an associated snapclone copy process in the background (refer to the snapclone details in the previous section). Once the snapclone copy process is done, the D-archive is completely populated, and it can exist independent of the D-snapshot from which it was created. It is worth noting that in Step 3, a snapclone copy process is being started on a space efficient snapshot. The existing implementation of snapclone copy process is modified suitably to allow this in the case of D-archives.

In the above sub-sections, the actual mechanisms for allocating disk space and generating the mapping Physical Address to fill the corresponding entries in mapping table for each segment is already covered in great detail in U.S. Pat. No. 6,915,397. In light of that, the same will not be repeated here.

Accessing Differential Backup Data

Case 1—Differential backup: D-snapshot, Complete Backup: B-snapshot. Note here that an D-snapshot cannot exist without a corresponding B-snapshot.

Case 2—Differential backup: D-archive, Complete Backup: B-snapshot. Note here that a D-archive can be created before (or, without) a corresponding B-archive being created, as long as a B-snapshot representing the complete backup exists.

Case 3—Differential backup: D-archive, Complete Backup: B-archive

In the above, it does not matter whether D-snapshot and B-snapshot is a Traditional Snapshot or a Space Efficient Snapshot (including snapclones).

Handling Backup Read and Differential Read Requests

In Case 1, the processing involved is in the following steps:

For a Read Request on a given Segment number 210 in this D-snapshot: if D-bit 215 is set, issue read request on the corresponding physical address 220 in the mapping table entry 201 for this segment; or if D-bit 215 is clear, if this is a backup read request, issue it on corresponding Segment number 210 on the Vdisk for the associated B-snapshot (available from B-snapshot-index field in the Vdisk meta-data for this D-snapshot), or if this is an differential read request, return ERROR or NULL or ZERO-filled bytes as appropriate, based on the desired implementation Case 2 and Case 3 are identical in the way they are handled, as described in the following steps:

For a Read Request on a given Segment number 210 in this D-archive: If D-bit 215 is set, issue read request on the corresponding Physical Address 220 in the mapping table entry (201) for this segment; or if D-bit 215 is clear, if this is a backup read request, issue read request on the corresponding Segment number 210 on the Vdisk for the associated B-snapshot/B-archive (available from B-archive-index field in the Vdisk meta-data for this D-archive), or if this is an differential read request, return ERROR or NULL or ZERO-filled bytes as appropriate, based on the desired implementation.

Handling Regular I/O Operations

For D-snapshot/B-snapshot:

1) I/O Read Requests on Vdisk for either a D-snapshot or B-snapshot are handled the same way they are handled for a regular snapshot.
2) Handling I/O Write requests on Vdisks for D-snapshots and B-snapshots are covered in detail in Section below entitled "Handling Writes on Snapshots".

For D-archive/B-archive:

1) Any I/O Write requests on Vdisk for either a D-archive or a B-archive will be failed immediately. Only I/O Read requests are allowed: a D-archive/B-archive contains "archive" data which is read-only in nature.
2) I/O Read requests on Vdisk for a B-archive are handled the same way they are handled for regular snapshots.
3) I/O Read requests on Vdisk for a D-archive can either be handled as a Backup Read Requests or Differential Read Requests based on the desired implementation choice. The related I/O processing is described under sub-section entitled "Accessing Differential backup data".

Like in any other operation, even for I/O operations, a D-snapshot/B-snapshot is recognized by the 'Bkup' attribute in the corresponding Vdisk meta-data. Similarly, a D-archive/B-archive is recognized by the 'Archive' attribute in the corresponding Vdisk meta-data.

Handling Writes on Snapshots

Snapshots are also available for writing (not just reading). This is one of the well known uses of snapshots in Virtualized Storage Arrays.

The exact steps in processing writes on Snapshots have been covered in detail above and in U.S. Pat. No. 6,915,397 and hence will not be repeated here. In the terminology used in that patent, a new logical disk created due to a snapshot operation is called predecessor, and the original logical disk is called successor. A given predecessor (snapshot) can become a successor (i.e., it can have a predecessor) if another snapshot (sometimes called pre-predecessor) is created from a given snapshot.

Proposed embodiments may provide direct support for online differential backups in virtualized storage arrays at negligible cost. In addition, differential backups may be made available directly in snapshots associated with the Original Vdisk (provided that the snapshots are not deleted).

The only major space overhead involved in online differential backup according to embodiments is the space needed to store the differential backup bitmap in the Vdisk meta-data (residing on secondary storage on disk) for each Snapshot. This corresponds to a very tiny fraction of the total disk space allocated to the Vdisk: only 256 KBytes disk space is needed for a 2 TeraByte Vdisk. Hence, the space overhead is negligible.

The only major time overhead involved is the time it takes to create differential backup bitmap at the time of creation of each Snapshot, namely by: issuing a single I/O (256 Kbytes payload) to read sharing bitmap from the B-snapshot; reversing the bits (to generate differential backup bitmap); and then issuing a single I/O (256 Kbytes payload) to write the differential backup bitmap for the snapshot being created.

Embodiments may also provide online standalone copies of backups, with additional capability of doing this automatically. In the case of differential backups, the corresponding disk space is managed efficiently: the disk space allocated is limited to only those disk segments that have changed since the time of complete backup until the time differential backup is created.

Embodiments may provide for a read-only view of the differential backup to be overlaid on top of the complete backup without having to do the restore of the corresponding backups.

Embodiments also comprise a system to manage the differential backups, both directly in snapshots and in standalone copies of backup information and maintain all the associations involved.

While specific embodiments have been described herein for purposes of illustration, various modifications will be apparent to a person skilled in the art and may be made without departing from the scope of the invention.

The invention claimed is:

1. A method for creating a complete backup of user data stored on a logical disk of a data storage array at a first, later time, the method comprising:

associating metadata with a first snapshot of the logical disk taken at the first, later time, the metadata comprising a mapping structure;

traversing sharing information linking the first snapshot, via one or more intervening predecessor snapshots, to a baseline snapshot of the logical disk to determine differential backup information identifying corresponding disk regions of the logical disk associated with user data that has changed in the first snapshot relative to the baseline snapshot, the baseline snapshot being a complete copy of the logical disk taken at a second, earlier time that precedes the later, first time;

converting the first snapshot to a differential snapshot by populating the mapping structure with the differential backup information;

creating the complete backup of the user data stored on the logical disk at the first, later time based on the differential backup information, the complete backup being created by reading changed user data stored on a differential backup of the differential snapshot taken at the first, later time and reading unchanged user data stored on the baseline snapshot taken at the second, earlier time, the differential backup being populated with the user data that changed but not the user data that did not change between the first, later time and the second, earlier time.

2. The method of claim 1, wherein the metadata further comprises a pointer to the baseline snapshot of the logical disk, and the baseline snapshot is associated with metadata defining a relationship between the logical disk at the second, earlier time and user data stored on uniquely identifiable segments of physical storage in the data storage array at the second, earlier time.

3. The method of claim 1, further comprising:
creating the baseline backup of the logical disk by copying the baseline snapshot;
associating differential backup metadata with the differential backup, the differential backup metadata comprising the populated mapping structure; and
maintaining in the baseline backup and the baseline snapshot a pointer to the differential backup.

4. The method of claim 1, wherein the differential backup information is represented as differential backup bits, each differential backup bit corresponding to a corresponding disk region of the logical disk and each differential backup bit being set to a first value or a second value to indicate that the user data associated with the corresponding disk region has changed or not changed, respectively.

5. A method as defined in claim 1 further comprising creating a read-only view of the user data stored on the logical disk at the first, later time, without copying a disk region from the differential snapshot or from the differential backup onto a virtual disk containing user data from the baseline snapshot or the baseline backup.

6. The method of claim 1, wherein traversing the sharing information results in a sharing bitmap containing sharing bits, each sharing bit corresponding to a unique disk region of the logical disk and indicating whether user data associated with the corresponding unique disk region is shared between the first snapshot and the baseline snapshot, and the differential backup information is created by inverting the sharing bits.

7. A system for differential backup of a logical disk of a data storage array comprising:
a memory to store metadata associated with a differential snapshot of the logical disk taken at a first, later time, the metadata comprising a mapping structure populated with differential backup information identifying disk regions of the logical disk associated with user data that has changed in the differential snapshot of the logical disk relative to a baseline snapshot of the logical disk, the baseline snapshot being a complete copy of the logical disk taken at a second, earlier time preceding the first, later time, and the differential backup information being created by traversing sharing information linking the differential snapshot, via one or more intervening predecessor snapshots, to the baseline snapshot; and
a processor to:
create a read-only view of the user data stored on the logical disk at the first, later time by determining, based on the differential backup information, whether the user data has changed, and, if the user data has not changed, reading the user data from the baseline snapshot taken at the second, earlier time or a backup copy of the baseline snapshot, or, if the user data has changed, reading the user data from a differential backup of the differential snapshot taken at the first, later time, the differential backup being populated, based on the differential backup information, with user data that has changed but not being populated with user data that has not changed.

8. The system of claim 7, wherein traversing the sharing information results in a sharing bit map comprising a set of sharing bits indicating whether the differential snapshot and the baseline snapshot share user data and the differential backup information includes an inverted form of the sharing bits.

9. The system of claim 7, wherein the metadata further comprises a pointer to the baseline snapshot.

10. A tangible computer readable storage medium comprising computer readable instructions, which instructions, when executed, cause a computer to at least:
associate metadata with a first snapshot of a logical disk taken at a first, later time, the metadata comprising a mapping structure;
traverse sharing information linking the first snapshot, via one or more intervening predecessor snapshots, to a baseline snapshot of the logical disk taken at a second, earlier time to determine differential backup information identifying a disk region of the logical disk associated with user data that has changed in the first snapshot relative to the baseline snapshot, the second, earlier time preceding the first, later time;
convert the first snapshot to a differential snapshot by populating the mapping structure based on the differential back up information to indicate a disk region of the logical disk that has changed in the differential snapshot of the logical disk relative to the baseline snapshot of the logical disk; and
read, based on the differential backup information, unchanged user data from the baseline snapshot taken at the second, earlier time or from a copy of the baseline snapshot and changed user data from a differential backup of the differential snapshot taken at the first, later time, the differential backup being populated with the user data that has changed but not being populated with the user data that has not changed.

11. The computer readable medium of claim 10, wherein the differential backup information is represented as differential backup bits, each differential backup bit corresponding to a disk region of the logical disk and each differential backup bit being set to a first value or a second value to indicate that the user data associated with the corresponding disk region has changed or not changed, respectively.

12. The computer readable medium of claim 10, wherein:
traversing the sharing information results in a sharing bitmap containing sharing bits, each sharing bit corresponding to a disk region of the logical disk and each sharing bit indicating whether user data associated with the corresponding disk region is shared between the first snapshot and the baseline snapshot; and the differential backup information is created by inverting the sharing bits.

* * * * *